United States Patent [19]

Pelzer

[11] Patent Number: 5,624,619
[45] Date of Patent: Apr. 29, 1997

US005624619A

[54] MOULDED ARTICLES WITH LEATHER-LIKE SURFACE PROPERTIES FOR USE IN THE AUTOMOBILE INDUSTRY

[75] Inventor: Helmut Pelzer, Witten-Annen, Germany

[73] Assignee: HP - Chemie Pelzer Research & Development, Ltd., Waterford, Ireland

[21] Appl. No.: 373,217

[22] PCT Filed: Jul. 10, 1993

[86] PCT No.: PCT/EP93/01812

§ 371 Date: Jan. 18, 1995

§ 102(e) Date: Jan. 18, 1995

[87] PCT Pub. No.: WO94/02300

PCT Pub. Date: Feb. 3, 1994

[30] Foreign Application Priority Data

Jul. 18, 1992 [DE] Germany .......................... 42 23 703.3

[51] Int. Cl.⁶ ............................................. B29C 70/06
[52] U.S. Cl. ................................. 264/109; 264/DIG. 69
[58] Field of Search ............................. 264/112, 114, 264/109, DIG. 69, 119, 438

[56] References Cited

U.S. PATENT DOCUMENTS

| | | | |
|---|---|---|---|
| 4,497,871 | 2/1985 | Henke | 428/473 |
| 5,171,494 | 12/1992 | Nishibori | 264/48 |
| 5,405,563 | 4/1995 | Hayashi et al. | 264/55 |

FOREIGN PATENT DOCUMENTS

| | | |
|---|---|---|
| 0092594 | 2/1983 | European Pat. Off. . |
| 0089029 | 9/1983 | European Pat. Off. . |
| 0256663 | 2/1988 | European Pat. Off. . |
| 2120149 | 11/1972 | Germany . |
| 2700505 | 7/1978 | Germany . |
| 3417369 | 11/1984 | Germany . |
| 3823157 | 2/1990 | Germany . |
| 57/154472 | 9/1984 | Japan . |
| 87-024105 | 12/1986 | Japan . |

OTHER PUBLICATIONS

*Ullmanns Encyklopadie der Technischen Chemie*, 4th ed., vol. 16, p. 174.

*Primary Examiner*—Mary Lynn Theisen
*Attorney, Agent, or Firm*—Banner & Witcoff, Ltd.

[57] ABSTRACT

Subject matter of the present invention are molded articles with leather-like surface properties in the automobile industry as well as processes for the production thereof. These can be prepared in such a way that ground waste leather is added to thermoplastic materials or elastic duroplasts in an amount of up to 95% per weight. By this way, a leather-like soft feel and a certain water absorption capacity can be attained in thermoplastic materials.

5 Claims, No Drawings

MOULDED ARTICLES WITH LEATHER-LIKE SURFACE PROPERTIES FOR USE IN THE AUTOMOBILE INDUSTRY

BACKGROUND OF THE INVENTION

The subject matter of the invention are moulded articles with leather-like surfaces for use in the automobile industry as well as a process for the production thereof.

The use of waste leather is known from "Ullmanns Encyklopädie der technischen Chemie", 4. ed., vol. 16, p. 174. According to this, waste leather can be defibrated and subsequently can be processed to fibrous waste leather. By this single-layered sheet materials of leather fibers and binders are understood. According to this, the fibrous leather materials are used for bag leather goods, but particularly in the production of shoes as well as for technical leather gaskets. The waste leather materials are, for instance, wet or dry ground in crushing mills, or wet ground in toothed disk mills and refiners, or also wet defibrated in hollander beaters, whereby the fibers should have a length of 3 to 12 mm. Water insoluble, particularly natural or synthetic rubber latices as well as dispersions of acrylic ester, vinylester and isobutylene polymerizate and mixed polymerizates have been found to be particularly successful as binders. The amount of binder is between 8 and 40%. With fibrous leather materials having higher portions (20 to 30%) of water insoluble binders, the characteristics of the binder are according to this preponderating. With goods having a lower content of binder (less than 20%), the fibrous character is preponderating; these materials are more absorptive and more leather-like.

From DE 34 17 369 C2 a process is known for producing an injection-mouldable compound material in which a polyester-cotton mixed fiber from waste fabric is fused with a polyolefin. However, the material prepared in this way does not have a sufficient water-absorbing capacity, as well as the feel characteristics, typical of leather.

DE 21 20 149 A1 describes weather resistant and torsion-free plates, tubes, rods and other moulded articles consisting of binders and filler made of used material, among other things waste of paper, cardboard articles, knitted goods, cottons, linens, synthetic fibers, leather, rags, hay, straw, foliage, grass, shells of cereals and fruits, pits and peels of fruits and potatoes as well as metal chips, metal grains, metal powders, metals, polystyrene, waste from plastic processing, natural fibers like jute, sisal or hemp. Information about the amounts of used filler materials is not included.

OBJECT OF THE INVENTION

In opposition to that, the object of the present invention consists in the fact to provide moulded articles with leather-like surface properties in the automobile industry on the basis of thermoplastic materials or elastic duroplasts which, however, have a soft leather-like feel and the water-absorbing capacity, typical of leather.

DESCRIPTION OF THE PREFERRED EMBODIMENTS

In a first embodiment of the present invention, the above mentioned object is resolved by moulded articles in the automobile industry having leather-like surface properties, comprising a thermoplastic material or an elastic duroplast and ground waste leather in an amount of up to 95% per weight in relation to the moulded article.

Steering wheel coverings in the automobile sector are often made of thermoplastic polyurethane foams. The plastic foam is applied on a core of metal or splinterproof plastic according to the per se known injection moulding process. However, the disadvantages of such steering wheel coverings, which are known in the state of the art, are the non-existent water-absorbing capacity and the relatively hard feel of the used polyurethane foam.

It has been found now by means of the present invention that by using ground waste leather, the surface properties of such moulded articles could be substantially improved. By this way, a leather-like soft feel and a high water-absorbing capacity was attained when waste leather in an amount of, for instance, 70% per weight was added to the polyurethane during the injection moulding.

The fiber length of the waste leather does principally influence the surface structure and particularly the visual appearance and the feel of the moulded articles to be produced. According to this, in another embodiment of the present invention it is preferred that the fiber length of the waste leather is 0.1 to 10 mm, particularly 0.1 to 5 mm.

Besides the fiber length, it is self-evident that additionally the amount of the ground waste leather to be used, is of particularly importance for the leather-like surface properites. A too low amount of the ground waste leather is not suitable to provide the desired leather-like surface properties. According to this, in a further embodiment of the present invention it is particularly preferred to add the ground waste leather in an amount of from 20 to 95% per weight, particularly 60 to 80% per weight.

The desired surface propterties can be further refined or accentuated by subsequent treatments of the surface area by means of the most different processes. For instance, it is possible to prepare the desired surface treatment by embossing, grinding, plasma treatment, corona discharge, sandblasting or shot peening.

By means of the present invention, it is possible to produce a series of moulded articles in the automobile industry, e.g. surface coatings of objects, parts of installations, textiles, facings, sheathing, particularly floor coverings, linings of luggage trunks, roof linings, dashboard sheathing, switches, shift lever knobs, door knobs and/or steering wheel coverings. In the praxis, the waste leather can be used in any place where the optical properties play an important role. Furthermore, a sound-insulating is also of importance.

Moulded articles in the meaning of the present invention comprise, besides such that essentially consist of thermoplastic waste materials and waste leather, also such whereby the mixture of these components is applied to a carrier, e.g. a nonwoven fabric. In this way, besides a covering in the form of layers, the provision of composite material is comprised.

Generally, the way of adding the waste leather to the thermoplastic materials or elastic duroplasts is not critical. Principally, the ground waste leather may be added during the production or processing of the plastic material.

According to this, in a further embodiment of the present invention it is preferred to add the ground waste leather during the polymerization, polycondensation or polymer conversion. In the same way it is naturally possible, to add the ground waste leather during compounding, particularly when mixing, rolling, kneading, granulating, particularly hot-cut pelletization or strand pelletization, comminution or grinding of the thermoplastic materials.

Furthermore, it is particularly preferred to add the ground waste leather during casting, particularly monomer casting, film casting, die casting, pouring out, rotational casting and centrifugal casting, immersion, particularly paste dipping, powder dipping and coating, sintering, particularly sintering moulding, pour sintering, rotational sintering, fluidized-bed coating, flame spraying and electrostatic coating, foaming, compression, rolling, calendering, extrusion or injection moulding.

A further embodiment of the process according to the invention is to be seen in the application of waste leather in the form of fibers of the same length to the still uncured moulded article, feeding an electrostatic field to the plastic material and curing the plastic material.

In this case, fibers form waste leather of the same length are sprinkled over the still uncured moulded article made of thermoplastic material or elastic duroplast, and thereby being exposed to an electrostatic field (e.g., of from 20 000 to 60 000 volts). The fibers cut to the same length are aligned in the electrostatic field and are shooting like little spears into the still viscous surface area of the plastic material. However, the acceleration of the fibers is limited by the high-voltage; also, the distance between the poles should not be too large because the air causes a retardation anyway, and an increase of the voltage no more causes an acceleration, at the most a spark discharge.

The unassembled fiber powder can be eliminated at the desired places by commutation of the electrostatic field or by beating under simultaneous sucking-off.

I claim:

1. Process for producing moulded articles for use in the automobile industry, said articles comprising a thermoplastic material or elastic duroplast, and ground leather waste having a fiber length of from 0.1 to 5 mm in an amount of from 60 to 95% per weight in relation to the moulded article, said process comprising polymerization or polycondensation of thermoplastic material or elastic duroplast, said thermoplastic material or elastic duroplast containing ground leather waste having a fiber length of from 0.1 to 5 mm added to the thermoplastic material or elastic duroplast in an amount from 60 to 95% per weight in relation to the moulder article during the polymerization or polycondensation.

2. Process according to claim 1, wherein the ground leather waste is applied in the form of fibers of the same length to the still uncured moulded article, an electrostatic field being applied thereto and the plastic material being cured.

3. Process according to any one of claims 1 and 2, wherein desired surface properties are made by embossing, grinding, plasma treatment, corona discharge, sandblasting or shot peening.

4. Process for producing moulded articles according to any one of claims 1 and 2, said article, comprising one or more of surface coatings of articles, parts of installations, textiles, facings, sheathing, particularly floor coverings, linings of luggage trunks, roof linings, dashboard sheathing, switches, shift lever knobs, door knobs and steering wheel coverings.

5. Process for producing molded articles for use in the automobile industry, said articles comprising a thermoplastic material or elastic duroplast, and ground leather waste having a fiber length of from 0.1 to 5 mm in an amount of from 60 to 95% per weight in relation to the moulded article, said process comprising polymerization, polycondensation or polymer conversion of thermoplastic material or elastic duroplast, said thermoplastic material or elastic duroplast containing ground leather waste having a fiber length of from 0.1 to 5 mm added to the thermoplastic material or elastic duroplast in an amount of from 60 to 95% per weight in relation to the moulded article, wherein the ground leather waste is applied in the form of fibers of the same length to the still uncured moulded article, an electrostatic field being applied thereto and the plastic material being cured.

* * * * *